3,338,926
PROCESS FOR THE HYDROLYSIS OF CYCLIC
ACETALS AND KETALS
Francisco Alvarez, John B. Siddall, and Augusto Ruiz, Palo Alto, Calif., assignors to Syntex Corporation, Panama, Panama, a corporation of Panama
No Drawing. Filed May 2, 1966, Ser. No. 546,602
10 Claims. (Cl. 260—397.4)

This is a continuation-in-part of copending application Ser. No. 460,462, filed June 1, 1965, now abandoned.

This invention relates to a process for the preparation of cyclopentanophenanthrene derivatives.

More particularly, this invention relates to a novel method for the conversion, in good yields and with a minimum of by-product formation, of cyclic acetal and ketal derivatives of dihydroxy steroids of the androstane, estrane, pregnane, 19-norpregnane, cholestane and sapogenin series, wherein the hydroxyl groups are on adjacent or nonadjacent carbon atoms in the steroid nucleus or side chains, to the corresponding free dihydroxy steroids.

The cyclic acetal and ketal derivatives which can be converted to the corresponding dihydroxy steroids by the novel process of the present invention can be represented by the general formula:

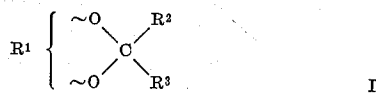

wherein $R^1$ represents the steroid nucleus, including the side chains and the carbon atoms to which the cyclic acetal or ketal group is attached; the symbol $\sim$ represents either the $\alpha$- or the $\beta$-configuration; $R^2$ and $R^3$, taken alone, can each represent hydrogen, a lower alkyl (including substituted and unsubstituted lower alkyl and cycloalkyl) group, an aryl (including substituted and unsubstituted aryl, alkaryl and aralkyl) group or a monocyclic heterocyclic (including substituted and unsubstituted heterocyclic) group; and $R^2$ and $R^3$, taken together with the carbon atoms to which they are attached, can also represent a cycloalkyl, or monocyclic heterocyclic group.

It has been known for some time that the reaction of a dihydroxy steroid, wherein the hydroxyl groups are not too widely separated, with an aldehyde or ketone in the presence of a strong acid catalyst produces the corresponding cyclic acetal or ketal.

In many cases, the formation of a cyclic acetal or ketal grouping produces steroid derivatives having enhanced therapeutic activity, and frequently such groupings will be introduced after various transformations have been carried out elsewhere in the steroid molecule. However, these groupings also have potentially great value in the preparation of other steroid derivatives using reactions which would normally affect unprotected hydroxyl groups. For example, cyclic acetal and ketal groupings, and particularly those which themselves contain no reactive groupings, e.g., an isopropylidenedioxy grouping, are not affected by submitting compounds containing them to alkylation, acylation, ketalization, epoxidation, bromination, oxidation, reduction or certain acid-catalyzed rearrangements.

Nevertheless, up to the present time the difficulties encountered in removing cyclic acetal and ketal groupings following transformations elsewhere in the steroid molecule constitute a serious drawback to their use as protective groups, especially in commercial production of steroids.

The reported conditions for the removal of cyclic acetal and ketal groupings call for refluxing for prolonged periods of time in concentrated aqueous formic acid of up to 90% strength. These conditions almost invariably result in an appreciable amount of by-product formation through esterification of free hydroxyl groups on the nucleus or in the side chains (producing, for example, 21-formoxy steroids which, if they also contain a 17α-hydroxyl group and are later hydrolyzed, will in part undergo D-homo rearrangement no matter how mild the base used, or 11β-formoxy steroids, which can only be hydrolyzed back to the free alcohols under relatively drastic conditions, thus giving rise, again in the case of the 17α-hydroxypregnanes, to an even greater amount of D-homo rearrangement), degradation of a dihydroxy-acetone side chain, if present, or destruction of acid-sensitive groups elsewhere in the steroid molecule, or all of these, leading to poor yields of free dihydroxy final product contaminated with relatively large amounts of unwanted by-products.

The present invention affords a practical solution to these difficulties by providing a novel and efficient method for the conversion of steroidal cyclic acetal and ketal derivatives to the corresponding dihydroxy steroids. More particularly, we have now discovered, quite unexpectedly, that by treating cyclic acetal and ketal derivatives of dihydroxy steroids of the androstane, estrane, pregnane, 19-norpregnane, cholestane and sapogenin series with aqueous solutions of hydrogen halides at relatively low temperatures, the corresponding dihydroxy steroids are obtained in greater yields and with less by-product contamination than had hitherto generally been possible using the known methods of hydrolyzing cyclic acetal and ketal derivatives.

A further advantage of the novel process of the present invention is that many acid-sensitive groupings elsewhere in the steroid molecule, such as hydroxyl groups, cyclopropyl groups, and the like, are stable under the conditions employed.

It is to be understood that by the term "aqueous solutions of hydrogen halides" is intended conventional hydrohalic acids, particularly hydrofluoric and hydrochloric acid.

The novel process of the present invention is carried out by adding the steroidal cyclic acetal or ketal derivative to aqueous hydrohalic acid containing between 20% and 90% by weight of hydrogen halide, preferably from about 35% to about 55%. Generally the maximum concentration of hydrochloric acid is limited to 37% to 38% by weight at room temperature and at atmospheric pressure. By increasing the pressure, the concentration of hydrochloric acid can be increased, but the 37% to 38% concentration is normally satisfactory. With hydrofluoric acid, aqueous solutions containing about 48% to 70% of hydrogen fluoride are generally employed. Hydrochloric and hydrofluoric acid are conveniently employed at reagent grade concentrations of about 38% and about 48%, respectively. The amount of acid employed may range from 10 mols or less to about 600 mols, preferably from about 20 to about 60 mols of hydrochloric acid and from about 20 to about 160 mols of hydrofluoric acid, per mol of cyclic acetal or ketal. Generally the process is executed at a temperature in the range of from —30° C. to about 25° C. or higher, and preferably from about —5° C. to about 5° C. The reactants are stirred for a period of from about 30 minutes to about 30 hours or longer with hydrofluoric acid and for 1 to 5 minutes after a solution is obtained with hydrochloric acid, generally from about 10 to 20 minutes.

If desired, inert organic solvents can be added to the reaction mixture ranging in amounts up to 50% by volume, and more often ranging in amounts from about 25% to 35% by volume, based on the total volume of the reaction mixture. Among the solvents which may be employed are water-soluble ethers such as dioxane, tetrahydrofuran, tetrahydropyran, ethyleneglycol monoethyl ether acetate, higher polyethylene and polypropyleneglycol ethers, ether esters and the like, as well as mixtures thereof.

At the end of the reaction period, the dihydroxy steroid can be isolated in a conventional manner. For example, the reaction mixture is added to an ice cooled aqueous alkali solution, such as sodium or potassium carbonate or bicarbonate, containing an excess of alkali. As equally practical, the ice cooled aqueous alkali solution can be added to the reaction mixture. The product may be isolated by extracting it from the mixture with an organic solvent such as methylene chloride, diethyl ether, hexane and the like. Additional purification can be effected through recrystallization and/or chromatography, if necessary.

One class of cyclic acetals and ketals which can be hydrolyzed to the corresponding dihydroxy steroids by the novel process of the present invention encompasses the 16α,17α-cyclic acetals and ketals of the pregnane and 19-norpregnane series represented by the general formula:

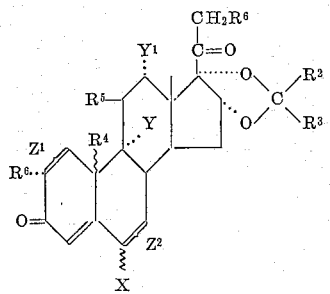

II

In this formula $R^2$, $R^3$ and the symbol ∼ have the same meanings as set forth hereinabove for Formula I; $R^4$ and $R^6$ represent hydrogen or methyl; $R^5$ represents hydrogen, β-hydroxyl or a keto group; $R^6$ represents hydrogen, halogen, i.e., fluoro, chloro, bromo or iodo, hydroxyl or acyloxy; X represents hydrogen, methyl, fluoro or chloro; Y and $Y^1$ represent hydrogen, methyl, halogen, hydroxyl or acyloxy, with at least one of Y and $Y^1$ being hydrogen and with both Y and $Y^1$ being hydrogen when $R^5$ is hydrogen; and $Z_1$ and $Z_2$ represent either a saturated linkage or a double bond between the carbon atoms at the 1 and 2 and 6 and 7 positions, respectively.

Typical 16α,17α-cyclic acetals and ketals coming within the scope of this general formula include the 16α,17α-isopropylidenedioxy; 16α,17α-(2′-butylidenedioxy); 16α,17α-(3′-pentylidenedioxy); and 16α,17α-(4′-methyl-2′-pentylidenedioxy) derivatives of:

6α-methyl-16α,17α-dihydroxypregn-4-ene-3,20-dione;
6α-fluoro-16α,17α-dihydroxypregn-4-ene-3,20-dione;
6α-chloro-16α,17α-dihydroxypregn-4-ene-3,20-dione;
6α-chloro-16α,17α-dihydroxy-19-norpregn-4-ene-3,20-dione;
6-chloro-16α,17α-dihydroxypregna-4,6-diene-3,20-dione;
6α-chloro-16α,17α-dihydroxy-19-norpregna-4,6-diene-3,20-dione;
6α-methyl-11β,16α,17α-trihydroxypregn-4-ene-3,20-dione;
6α-chloro-11β,16α,17α-trihydroxypregn-4-ene-3,20-dione;
6α-methyl-16α,17α-dihydrozypregn-4-ene-3,11,20-trione;
6α-fluoro-16α,17α-dihydroxypregn-4-ene-3,11,20-trione;
9α-fluoro-11β,16α,17α-trihydroxypregna-1,4-diene-3,20-dione;
9α-fluoro-16α,17α-dihydroxypregn-4-ene-3,11,20-trione;
21-chloro-11β-16α,17α-trihydroxypregn-4-ene-3,20-dione;
11β,16α,17α,21-tetrahydroxypregn-4-ene-3,20-dione;
16α,17α,21-trihydroxypregn-4-ene-3,11,20-trione;
16α,17α,21-trihydroxypregna-1,4-diene-3,11,20-trione;
2-methyl-11β,16α,17α,21-tetrahydroxypregna-1,4-diene-3,20-dione;

6α-methyl-11β,16α,17α,21-tetrahydroxypregn-4-ene-3,20-dione;
6α-methyl-11β,16α,17α,21-tetrahydroxypregna-1,4-diene-3,20-dione;
6α-methyl-16α,17α,21-trihydroxypregna-1,4-diene-3,11,20-trione;
6α-fluoro-11β,16α,17α,21-tetrahydroxypregn-4-ene-3,20-dione;
6α-fluoro-11β,16α,17α,21-tetrahydroxypregna-1,4-diene-3,20-dione;
6α-fluoro-16α,17α,21-trihydroxyphegn-4-ene-3,11,20-trione;
6α-fluoro-16α,17α,21-trihydroxypregna-1,4-diene-3,11,20-trione;
9α-fluoro-11β,16α,17α,21-tetrahydroxypregn-4-ene-3,20-dione;
9α-fluoro-11β,16α,17α,21-tetrahydroxypregna-1,4-diene-3,20-dione;
9α-fluoro-16α,17α,21-trihydroxypregna-1,4-diene-3,11,20-trione;
6α-methyl-9α-fluoro-11β,16α,17α,21-tetrahydroxypregn-4-ene-3,20-dione;
6α-methyl-9α-fluoro-11β,16α,17α,21-tetrahydroxypregna-1,4-diene-3,20-dione;
6α-methyl-9α-chloro-11β,16α,17α,21-tetrahydroxypregna-1,4-diene-3,20-dione;
6α,9α-difluoro-11β,16α,17α,21-tetrahydroxypregn-4-ene-3,20-dione, and the like.

Other classes of 16α,17α-cyclic acetal and ketal-containing steroids besides that described hereinabove can also be efficiently hdyrolyzed by the novel process of the present invention. These include 9β-steroids, such as 16α,17α - isopropylidenedioxy - 9β-Δ⁴-pregnen-21-ol-3,11,20-trione or the like, retro steroids, i.e., those having the 9β,10α-steric configuration, such as 16α,17α-isopropylidenedioxy-9β-10α-Δ⁴-pregnene-11β,21-diol-3,20 - dione or the like, 19-nor retro steroids, such as 16α,17α-isopropylidenedioxy - 19 - nor - 9β,10α - Δ⁴ - pregnen-21-ol-3,11,20-trione, oxa and aza steroids wherein oxygen or nitrogen is present in the ring structure, such as 16α,17α-isopropylidenedioxy - 4 - oxapregnane-11β,21-diol-3,20-dione or the like, B-homo steroids, such as B-homo-16α,17α - isopropylidenedioxy - 19 - nor-Δ⁵⁽¹⁰⁾-pregnen - 21-ol-3,20-dione or the like, 16,17-cyclic acetals and ketals of the androstane and estrane series, such as 16α,17α-isopropylidenedioxy-Δ¹,³,⁵-estratrien-3-ol or the like, and steroids having substituents elsewhere in the steroid nucleus and side chains, e.g., keto groups or derivatives thereof, such as enolized or ketalized keto groups (which will be hydrolyzed to free keto groups during the reaction), hydroxyl groups or derivatives thereof, such as esterified or etherified hydroxyl groups, alkyl groups, such as methyl, ethyl or propyl groups, halogen atoms, such as fluorine or chlorine, nitro groups, amino groups, double bonds, and the like.

Furthermore, as previously indicated, cyclic acetal and ketal-containing steroids which can be variously substituted in the manner described hereinabove wherein the cyclic acetal or ketal group is attached to positions other than the 16,17-positions of the steroid nucleus can also be hydrolyzed by the novel process of the present invention. These include, for example, the 1α,2α-cyclic acetal and ketal-containing steroids such as 1α,2α-isopropylidenedioxy - 9α-fluoro - 16α,21-bisacetoxy-17α-hydroxypregn-4-ene-3,11,20-trione; the 2β,3β-cyclic acetal and ketal-containing steroids such as 2β,3β-isopropylidenedioxy - 17α-methylestran-17β-ol; the 6α,7α-cyclic acetal and ketal-containing steroids such as 6α,7α - cyclohexylidenedioxy- 11β,17α,21 - trihydroxypregn-4-ene-3,20-dione; the 11β,12β-cyclic acetal and ketal-containing steroids such as 11β,12β-isopropylidenedioxy-17α - hydroxy - 21-acetoxypregna - 1,4 - diene - 3,20-dione; the 17α,21-cyclic acetal and ketal-containing steroids such as 17α,21-cyclopentylidenedioxy - 11β - hydroxypregna-1,4-diene-3,20 - dione; and the like.

In order that those skilled in the art can more fully understand the present invention, the following examples are set forth. These examples are given solely for the purpose of illustrating the invention, and should not be considered as expressing limitations. All parts and percentages are by weight unless otherwise stated.

EXAMPLE 1

Two hundred fifty mg. [0.60 mmol (millimol)] of 16α,17α - isopropylidenedioxy - 11β,21-dihydroxypregna-1,4-diene-3,20-dione were suspended in 2.5 cc. (60 mmols) of aqueous 48% hydrofluoric acid (thus giving approximately 100 mols of hydrofluoric acid per mol of steroid starting material), maintained at 0° C. in a polyethylene reaction vessel, and the resulting reaction mixture was stirred at 0° C. for 20 hours. Following this reaction period, the reaction mixture was neutralized by the addition of aqueous 5% potassium bicarbonate solution and then extracted with ethyl acetate. The thus-obtained extract was evaporated to dryness under reduced pressure to give a crude product which was then filtered through a silica gel column, eluting with 35% ethyl acetate in hexane and then with ethyl acetate alone. Evaporation of the final product-containing fractions of the eluate to dryness under reduced pressure, followed by recrystallization from acetone:hexane, gave 11β,16α,17α,21 - tetrahydroxypregna-1,4-diene-3,20-dione.

EXAMPLE 2

The procedure of Example 1 hereinabove was repeated in every detail except for the following. The steroid starting material employed was 11β,12β-isopropylidenedioxy-17α - hydroxy - 21 - acetoxypregna-1,4-diene-3,20-dione, and it was added to a mixture of 2.5 cc. of aqueous 48% hydrofluoric acid and 1.2 cc. of tetrahydrofuran, which gave a single phase reaction solution immediately. After working up the reaction mixture, 11β,12β,17α-trihydroxy-21-acetoxypregna-1,4-diene-3,20-dione was obtained.

EXAMPLE 3

Fifty-seven grams (0.132 mol) of 6α - fluoro - 9β,11β-oxido - 16α,17α - isopropylidenedioxy - 21 - hydroxypregna - 1,4 - diene - 3,20-dione were suspended in 570 cc. (19.95 mols) of aqueous 70% hydrofluoric acid (thus giving approximately 151 mols of hydrofluoric acid per mol of steroid starting material), maintained at −20° C. in a polyethylene reaction vessel, and the resulting reaction mixture was stirred at −20° C. for 15 hours. Following this reaction period, the reaction mixture was slowly poured into 5 liters of water, and 4 kilograms of potassium carbonate were then added in portions, thus giving a slightly alkaline solution from which the product precipitated. This precipitate was collected by filtration, washed with water until neutral and dried, thus giving a 90% yield of 6α,9α - difluoro - 11β,16α,17α,21-tetrahydroxypregna-1,4-diene-3,20-dione, melting point 260–264° C.

This procedure was then repeated in every detail but one, namely, 6α,9α - difluoro - 16α,17α - isopropylidenedioxy - 11β,21 - dihydroxypregna - 1,4 - diene - 3,20-dione was used as the steroid starting material, and 6α, 9α - difluoro - 11β,16α,17α,21 - tetrahydroxypregna-1,4-diene-3,20-dione, identical to that prepared as described hereinabove, was obtained.

EXAMPLE 4

One gram (2.3 mmol) of 16α,17α - isopropylidenedioxy - 6α - methyl - 9α - fluoro - 11β,21 - dihydroxypregna-1,4 - diene - 3,20-dione was added to 8.75 g. (90 mmols) of aqueous hydrochloric acid (giving approximately 40 mmols of hydrochloric acid per mol of starting material). The reaction mixture was maintained at 0° C. with continuous stirring until a homogeneous solution was obtained and then was stirred for one additional minute. The reaction mixture was poured into a mixture of ice and 10% aqueous sodium bicarbonate solution. The steroid was extracted with diethyl ether. The ether layer was washed with water until neutral, dried over anhydrous magnesium sulfate and evaporated at reduced pressure. The residue was then chromatographed on a silica gel column yielding 6α - methyl - 9α - fluoro - 11β,16α,17α,21 - tetrahydroxypregna - 1,4 - diene - 3,20 - dione, which was recrystallized from acetone:hexane.

EXAMPLE 5

Five hundred milligrams (1.45 mmols) of 16α,17α-isopropylidenedioxyestr-4-en-3-one were suspended in 10.5 g. (87.0 mmols) of aqueous 30% hydrochloric acid. The mixture was stirred while maintaining the temperature between −5° C. and 5° C. until a solution was obtained and then stirred for an additional two minutes. The reaction mixture was neutralized by the addition of an excess of ice-aqueous 10% sodium carbonate solution mixture. The organic layer was extracted with methylene chloride, washed with water until neutral, dried over sodium sulfate, and then evaporated to dryness at reduced pressure. The residue was crystallized from acetone:hexane to yield 16α,17α-dihydroxyestr-4-en-3-one.

EXAMPLE 6

Two and one-half grams (6.8 mmols) of 2α,3α-isopropylidenedioxy - 17α-ethynyl-17β-hydroxyandrost-4-ene were added to 14.0 g. (144 mmols) of an aqueous solution containing 37.6% by weight of hydrogen chloride. The mixture was stirred until a complete solution was obtained and then stirred for one additional minute. An excess of ice cooled aqueous 25% potassium carbonate solution was added to neutralize the acid. The mixture was extracted with methylene chloride. The extract was washed with water to neutrality, dried over sodium sulfate and evaporated to dryness to yield the 2α,3α,17β-trihydroxy-17α-ethynylandrost-4-ene.

EXAMPLE 7

Six grams of 6α-fluoro-16α-hydroxyhydrocortisone 16α,17α-acetonide were added to 150 cc. of concentrated hydrochloric acid (37.6%) at 0-5° C. This mixture was stirred at the same temperature for 13 minutes. At the end of this time the reaction mixture was neutralized with cold 10% sodium carbonate solution and extracted with methylene chloride. These extracts were washed with water to neutrality, dried over sodium sulfate and evaporated to dryness to yield 6α-fluoro-16α-hydroxyhydrocortisone, which was recrystallized from acetone:hexane.

The above procedure was repeated, using 38 g. of steroidal starting material in 750 cc. of concentrated hydrochloric acid, the reaction period being extended to 17 minutes. In both instances yields of approximately 60% were obtained.

What is claimed is:

1. The process for hydrolyzing a steroidal cyclic acetal or ketal, which is represented by the formula:

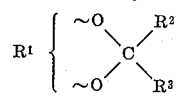

wherein $R^1$ is the steroid nucleus; $R^2$ and $R^3$ taken alone are selected from a group consisting of hydrogen, a lower alkyl group, an aryl group and a monocyclic heterocyclic group; and $R^2$ and $R^3$ taken together with the carbon atom to which they are attached are selected from the group consisting of a cycloalkyl group and a monocyclic heterocyclic group, to give the corresponding free dihydroxy steroidal compound, which comprises treating the steroidal cyclic acetal or ketal at a temperature from about −30° C. to about 25° C. with at least a 10-fold molar excess of an aqueous solution of from about 20% to about 90% by weight of hydrogen fluoride or hydrogen chloride.

2. The process according to claim 1 wherein the steroidal cyclic acetal or ketal is treated with from about 10-fold to about 160-fold molar excess of an aqueous solution of about 20% to about 38% by weight of hydrochloric acid at a temperature of from about −5° C. to about 5° C.

3. The process according to claim 1 wherein the steroidal cyclic acetal or ketal is treated with from about 20-fold to about 160-fold molar excess of an aqueous solution of about 37% to 38% by weight of hydrogen chloride at a temperature ranging from about −5° C. to about 5° C.

4. The process according to claim 1 wherein the steroidal cyclic acetal or ketal is treated with from about 20-fold to about 250-fold molar excess of an aqueous solution of about 48% to about 70% by weight of hydrogen fluoride at a temperature ranging from about −5° C. to about 5° C.

5. The process according to claim 1 wherein the steroidal cyclic acetal or ketal is treated with from about 20-fold to about 60-fold molar excess of an aqueous solution of about 48% to about 70% by weight of hydrogen fluoride at a temperature ranging from about −5° C. to about 5° C.

6. The process according to claim 1 wherein the steroidal cyclic acetal or ketal is treated with from about 20-fold to about 60-fold molar excess of an aqueous solution of about 48% by weight of hydrogen fluoride at a temperature ranging from about −5° C. to about 5° C.

7. The process according to claim 6 wherein the treatment is conducted in the presence of a water-miscible ether.

8. The process according to claim 1 wherein the steroidal cyclic acetal or ketal is derived from the $16\alpha,17\alpha$-dihydroxy pregnane series.

9. The process according to claim 8 wherein the steroidal cyclic acetal or ketal is treated with from about 20-fold to 160-fold molar excess of an aqueous solution of about 37% to 38% by weight of hydrogen chloride at a temperature ranging from about −5° C. to about 5° C.

10. The process according to claim 8 wherein the steroidal cyclic acetal or ketal is treated with from about 20-fold to about 60-fold molar excess of an aqueous solution of about 48% by weight of hydrogen fluoride at a temperature ranging from about −5° C. to about 5° C.

No references cited.

LEWIS GOTTS, *Primary Examiner.*

ELBERT L. ROBERTS, *Examiner.*